(12) United States Patent
Nomura

(10) Patent No.: US 11,449,173 B2
(45) Date of Patent: Sep. 20, 2022

(54) TOUCH CONTROLLER AND PEN INPUT SYSTEM

(71) Applicant: Wacom Co., Ltd., Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/996,598

(22) Filed: Aug. 18, 2020

(65) Prior Publication Data

US 2021/0072876 A1 Mar. 11, 2021

(30) Foreign Application Priority Data

Sep. 10, 2019 (JP) .............................. JP2019-164531

(51) Int. Cl.
| | |
|---|---|
| *G09G 5/00* | (2006.01) |
| *G06F 3/041* | (2006.01) |
| *G06F 3/044* | (2006.01) |
| *G06F 3/038* | (2013.01) |
| *G06F 1/3231* | (2019.01) |
| *G06F 1/3234* | (2019.01) |
| *G06F 1/3296* | (2019.01) |
| *G06F 3/0354* | (2013.01) |

(52) U.S. Cl.
CPC ........ *G06F 3/04166* (2019.05); *G06F 1/3231* (2013.01); *G06F 1/3262* (2013.01); *G06F 1/3296* (2013.01); *G06F 3/0383* (2013.01); *G06F 3/03545* (2013.01); *G06F 3/0441* (2019.05)

(58) Field of Classification Search
CPC ............... G06F 3/03545; G06F 3/0383; G06F 3/04166; G06F 3/0418; G06F 3/044; G06F 3/0441; G06F 1/3231; G06F 1/3262; G06F 1/3215; G06F 2203/04108; G06F 2203/04104; G06F 1/3296
USPC .................................................. 345/173, 179
See application file for complete search history.

(56) References Cited

U.S. PATENT DOCUMENTS

| | | | | |
|---|---|---|---|---|
| 9,703,433 | B2 * | 7/2017 | Chandran | ......... G06F 3/041661 |
| 2012/0154303 | A1 * | 6/2012 | Lazaridis | ............... G06F 1/3215 345/173 |
| 2014/0210781 | A1 * | 7/2014 | Stern | ....................... G06F 3/045 345/174 |
| 2015/0153803 | A1 * | 6/2015 | Tokutake | ............... G06F 1/3206 713/323 |
| 2017/0308186 | A1 | 10/2017 | Yamamoto | |

(Continued)

FOREIGN PATENT DOCUMENTS

WO 2016/129194 A1 8/2016

OTHER PUBLICATIONS

Microsoft, "About USB selective suspend," Jul. 7, 2011, 27 pages. (With English machine translation).

*Primary Examiner* — Jennifer T Nguyen
(74) *Attorney, Agent, or Firm* — Seed IP Law Group LLP

(57) ABSTRACT

A touch controller includes a processor and a memory coupled to the processor. The memory stores instructions that, when executed by the processor, cause the touch controller to: operate in an uplink power saving mode in which an uplink signal is transmitted with reduced power in response to reception of a suspend order from a host computer, and operate in a normal mode in which the uplink signal is transmitted with normal power in response to detection of a predetermined trigger during operation in the uplink power saving mode.

10 Claims, 7 Drawing Sheets

(56) References Cited

U.S. PATENT DOCUMENTS

| | | | |
|---|---|---|---|
| 2018/0088733 A1* | 3/2018 | Syed | G06F 1/3262 |
| 2018/0120962 A1* | 5/2018 | Hara | G06F 3/0412 |
| 2018/0188836 A1* | 7/2018 | Park | G06F 3/03545 |

* cited by examiner

TOUCH CONTROLLER AND PEN INPUT SYSTEM

BACKGROUND

Technical Field

The present disclosure relates to a touch controller and a pen input system.

Background Art

There is a known pen input system including a pen and a pen input apparatus that receives an input using the pen. The pen input apparatus is, for example, a tablet computer or a digitizer, and the pen input apparatus generally includes a touch controller that detects the pen, and a host computer. The host computer is an apparatus that executes various types of software including an operating system, various applications, and drivers of various types of hardware. The drivers executed by the host computer include a driver of the touch controller.

There are various known pens used in the pen input system. For example, International Publication Pamphlet No. WO. 2016/129194 (hereinafter, Patent Document 1) describes: a pen (first stylus 110) corresponding to two-way communication between the pen and a pen input apparatus and configured to transmit a pen signal once the pen detects an uplink signal transmitted by the pen input apparatus; a pen (second stylus 120) corresponding to only one-way communication from the pen to the pen input apparatus and configured to continuously transmit the pen signal while the power supply is on; and a pen (dual-mode stylus 130) corresponding to both of the two-way communication and the one-way communication, in which the pen alternately repeats the detection of the uplink signal and the transmission of the pen signal, shifts to the two-way communication when detecting the uplink signal, and shifts to the one-way communication to repeatedly transmit the pen signal when detecting a pen touch without detecting the uplink signal.

Furthermore, an operation called selective suspend is known in relation to a universal serial bus (USB) standard that is one of the standards for connecting a computer and a peripheral device (see "USB Selective Suspend", [online], Jul. 7, 2011, Microsoft Japan Company, Limited, Windows & Devices Development Department, [Searched on Sep. 7, 2019], Internet <URL: https://blogs.msdn.microsoft.com/jpwin/2011/07/07/usb-2/>). This is an operation for reducing the power consumption of the peripheral device connected to the host computer through the USB, and the driver operating on the host computer stops the transmission of start of frame (SOF) to launch the operation. Once the selective suspend is launched, the peripheral device operates with only minimum power necessary for detecting a wake-up event and generating a restart signal when the event occurs. The wake-up event is, for example, small vibration in a case of a mouse, and the peripheral device that has detected the wake-up event returns from the sleep state to the normal state.

However, the conventional selective suspend is not applied to the touch controller. This is because the pen that operates like the dual-mode stylus of Patent Document 1 is rare, and the transmission of the uplink signal transmitted by the touch controller cannot be stopped in the detection of a typical pen corresponding to two-way communication and configured to transmit a signal after detecting the uplink signal. As a result, the touch controller continues to always consume large power, and an improvement is necessary to reduce the power consumption.

SUMMARY

Therefore, an object of the present disclosure is to reduce the power consumption of a touch controller.

In addition, if the touch controller in the sleep state stops transmitting the uplink signal, the pen corresponding to two-way communication cannot have an opportunity for transmitting the pen signal and cannot start to communicate with the touch controller.

Therefore, another object of the present disclosure is to enable to start communication between a pen corresponding to two-way communication and a touch controller even if the touch controller in the sleep state stops transmitting an uplink signal.

The present disclosure provides a touch controller a processor and a memory coupled to the processor, wherein the memory stores instructions that, when executed by the processor, cause the touch controller to operate in an uplink power saving mode in which an uplink signal is transmitted with reduced power in response to reception of a suspend order from a host computer, and operate in a normal mode in which the uplink signal is transmitted with normal power in response to detection of a predetermined trigger during operation in the uplink power saving mode.

The present invention disclosure provides a pen input system including: an electronic pen which, in operation, transmits a pen signal; and a touch controller which operates in an uplink power saving mode in which an uplink signal is transmitted with reduced power in response to reception of a suspend order from a host computer, and operates in a normal mode in which the uplink signal is transmitted with normal power in response to detection of a predetermined trigger during operation in the uplink power saving mode.

The present disclosure provides a pen input system including: an electronic pen which, in operation, starts transmitting a pen signal in response to detection of a pen touch; and a touch controller which operates in an uplink power saving mode in which an uplink signal is not transmitted in response to reception of a suspend order from a host computer, and operates in a normal mode in which the uplink signal is transmitted in response to detection of the pen signal during operation in the uplink power saving mode.

According to the touch controller of the present disclosure, the predetermined trigger can be used to return the touch controller to the normal mode regardless of the uplink signal, and the power consumption of the touch controller is reduced.

Furthermore, according to the pen input system of the present disclosure, the pen starts to transmit the pen signal in response to the detection of the pen touch. Therefore, even when the transmission of the uplink signal is stopped in the uplink power saving mode, the touch controller can be triggered by the pen signal to return to the normal mode.

DETAILED DESCRIPTION

An embodiment of the present disclosure will now be described in detail with reference to the attached drawings.

Figure 1:
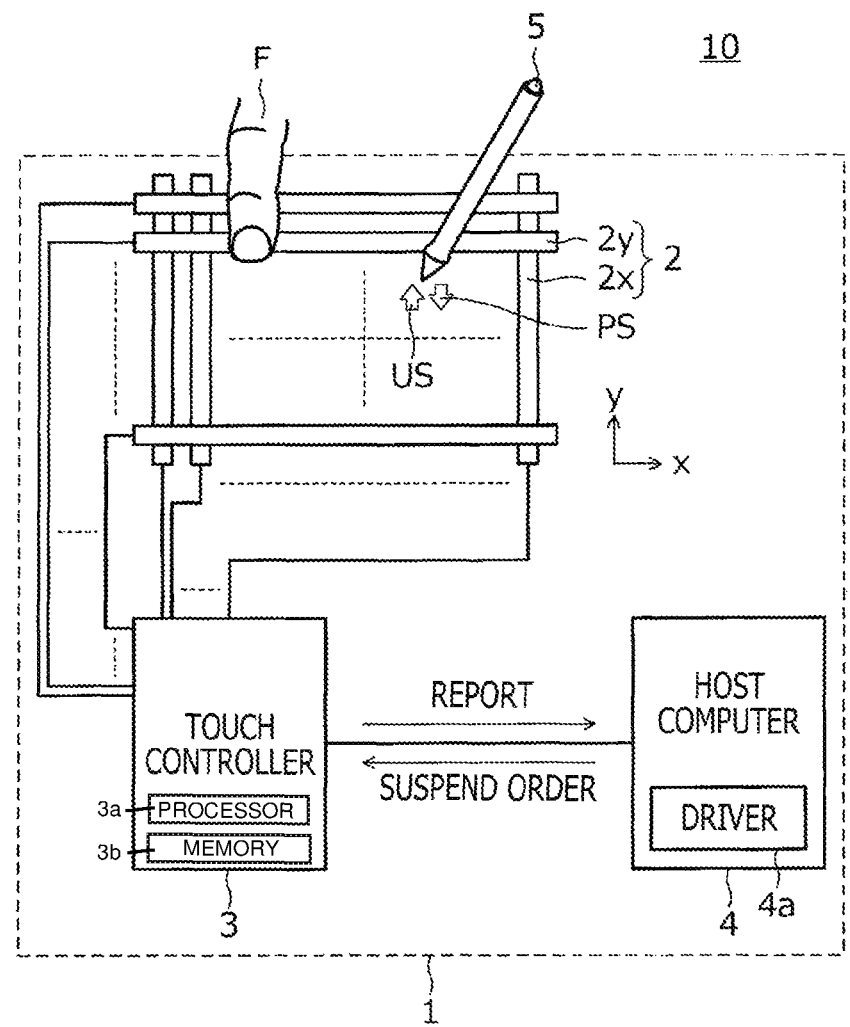
FIG. 1 is a diagram depicting a configuration of a pen input system according to a first embodiment of the present disclosure.

FIG. 1 is a diagram depicting a configuration of a pen input system 10 according to a first embodiment of the present disclosure. As illustrated in FIG. 1, a pen input system 10 includes a pen input apparatus 1 and a pen 5.

The pen input apparatus 1 is an apparatus that realizes an input using the pen 5, and the pen input apparatus 1 includes a touch surface for the pen input. Specifically, the pen input apparatus 1 is, for example, a tablet computer or a digitizer, and in the former case, the touch surface includes a panel surface of a display.

The pen input apparatus 1 includes a sensor electrode group 2, a touch controller 3, and a host computer 4 as illustrated in FIG. 1. The sensor electrode group 2 includes a plurality of sensor electrodes arranged directly below the touch surface. The plurality of sensor electrodes included in the sensor electrode group 2 include a plurality of X electrodes 2x extending in an illustrated y-direction and arranged at equal intervals in an x-direction (direction orthogonal to the y-direction) and a plurality of Y electrodes 2y extending in the illustrated x-direction and arranged at equal intervals in the y-direction.

The touch controller 3 is an integrated circuit connected to the sensor electrode group 2. The touch controller 3 includes a processor 3a that is coupled to a memory 3b storing instructions that, when executed by the processor 3a, cause the touch controller 3 to perform the various acts described herein. The touch controller 3 can derive the position of the pen 5 in the touch surface and can also derive the position of a finger F in the touch surface. In a typical example, the touch controller 3 uses an active capacitive system to detect the pen 5 and uses a capacitance system to detect the finger F. The derivation of the position of the pen 5 and the derivation of the position of the finger F are alternately performed, which will be described in detail later. The touch controller 3 is configured to transmit a report indicating the derived position to the host computer 4 every time the touch controller 3 derives the position of the pen 5 or the finger F. In addition to the derived position, the report also includes data (such as pen pressure value and pen identifier (ID)) transmitted by the pen 5 through a data signal described later.

Here, the touch controller 3 and the pen 5 can use, for example, the active capacitive system to perform two-way communication. Specifically, the touch controller 3 first uses the sensor electrode group 2 as a transmission antenna to periodically transmit an uplink signal US. In response to reception of the uplink signal US, the pen 5 transmits a pen signal PS from an electrode (nib electrode) provided on a nib. The touch controller 3 receives the pen signal PS through capacitive coupling between the nib electrode of the pen 5 and the sensor electrode group 2 and uses the result to derive the position of the pen 5.

The pen signal PS is a signal including: a burst signal that is an unmodulated carrier signal; and a modulated data signal with various types of data. Of these, the burst signal is used by the touch controller 3 to derive the position of the pen 5. That is, the touch controller 3 detects the reception strength of the burst signal for each of the plurality of sensor electrodes included in the sensor electrode group 2. The touch controller 3 then derives the position of the pen 5 based on the position of each sensor electrode and the reception strength in each sensor electrode.

The data signal is a signal used to transmit various types of data from the pen 5 to the touch controller 3. The various types of data transmitted through the data signal include a pen ID uniquely allocated to each of a plurality of pens 5, a pen pressure value indicating the pressure applied to the nib of the pen 5, and the like. The pen ID is stored in advance in a memory of the pen 5. The pen pressure value is detected by a pressure sensor built in the pen 5. The specific type of data transmitted by the pen 5 through the data signal is instructed from the touch controller 3 by using a command in the uplink signal US.

Figure 2:
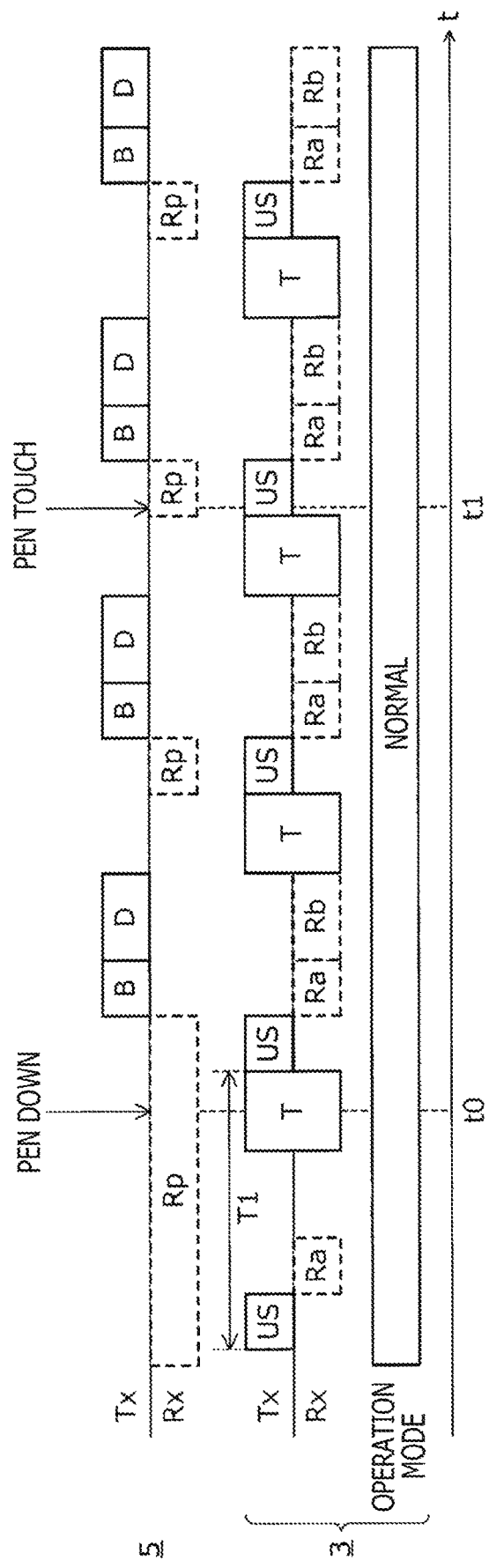
FIG. 2 is a diagram depicting a sequence of signals transmitted and received between a touch controller and a pen.

FIG. 2 is a diagram depicting a sequence of signals transmitted and received between the touch controller 3 and the pen 5. In FIG. 2 and the drawings described later, a signal B represents a burst signal included in the pen signal PS, and a signal D represents a data signal included in the pen signal PS. A reception period Ra represents a reception period of the burst signal B, and a reception period Rb represents a reception period of the data signal D. A reception period Rp represents a reception period of the uplink signal US, and a period T represents a detection period of a touch operation using the finger F.

As can be understood from FIG. 2, the touch controller 3 operating in a normal mode repeatedly transmits the uplink signal US at a certain cycle T1 (first cycle). The touch controller 3 also performs a reception operation of the burst signal B transmitted by the pen 5 just after the transmission of the uplink signal US and detects a touch operation using the finger F in the first cycle T1. Note that the transmission voltage of the uplink signal US in this case is a first voltage (for example, 9V).

Before receiving the uplink signal US, the pen 5 waits to receive the uplink signal US. Once the pen 5 approaches the touch surface so that the uplink signal US can be received, the pen 5 receives the uplink signal US transmitted first after the approach. In the example of FIG. 2, the pen 5 enters the reception range of the uplink signal US at time t0. Hereinafter, the pen 5 entering the reception range of the uplink signal US will be referred to as "pen-down."

Once the pen 5 receiving the uplink signal US after the pen-down transmits the burst signal B in response to the uplink signal US, the touch controller 3 receives the burst signal B and derives the position of the pen 5 as described above. The pen 5 also transmits the data signal D, following the burst signal B. The touch controller 3 also receives the data signal D and demodulates the data signal D to acquire the data transmitted by the pen 5. Subsequently, although not illustrated in FIG. 2, the touch controller 3 generates a report including the derived position and the acquired data and outputs the report to the host computer 4.

FIG. 2 also illustrates time t1 at which the nib of the pen 5 touches the touch surface. Hereinafter, the nib of the pen 5 touching the touch surface will be referred to as "pen touch." Although the pen pressure value detected by the pen 5 changes to a value greater than 0 after the pen touch, the configuration of the transmitted and received signals are similar to before the pen touch.

FIG. 1 will be described again. The host computer 4 is an apparatus including a processor, a memory, and various input-output apparatuses, such as a display and a communication apparatus. The touch controller 3 is one of the various input-output apparatuses provided on the host computer 4. The host computer 4 can execute various types of software including an operating system, various applications, and drivers of various types of hardware. The drivers include a driver 4a of the touch controller 3. The various applications include a drawing application that draws a picture by generating stroke data based on a pen input.

Part of the functions of the drawing application regarding the pen input will be specifically described. Once the drawing application receives a report from the touch controller 3, the drawing application first acquires position data in the report. The drawing application then generates stroke data including a series of control points based on a plurality of pieces of sequentially acquired position data. When the report includes a pen ID, the drawing application also performs a process based on the pen ID. The process is, for example, a process of setting a drawing color in the stroke data when the drawing color is set in association with the pen ID in the application. The drawing application further performs a process of setting the line width, the transparency, or the like of the stroke data according to a pen pressure value when the pen pressure value is included in the report.

The driver 4a performs a process of receiving the report from the touch controller 3 and transferring the report to various applications and also performs a process of transmitting a suspend order to the touch controller 3 when the reception of the report is ceased for a certain time. Note that the transmission of the suspend order may be physically performed by transmitting a predetermined signal from the driver 4a to the touch controller 3 or may be performed by stopping the transmission of a signal (for example, the SOF) usually transmitted from the driver 4a to the touch controller 3. The touch controller 3 receiving the suspend order enters into an uplink power saving mode in which the power in transmitting the uplink signal is reduced. The touch controller 3 then continuously performs a detection operation of a predetermined trigger and returns to the normal mode in response to detection of the predetermined trigger as a result of the detection operation.

Five examples of a process performed by the touch controller 3 receiving the suspend order will be described in detail.

Figure 3:
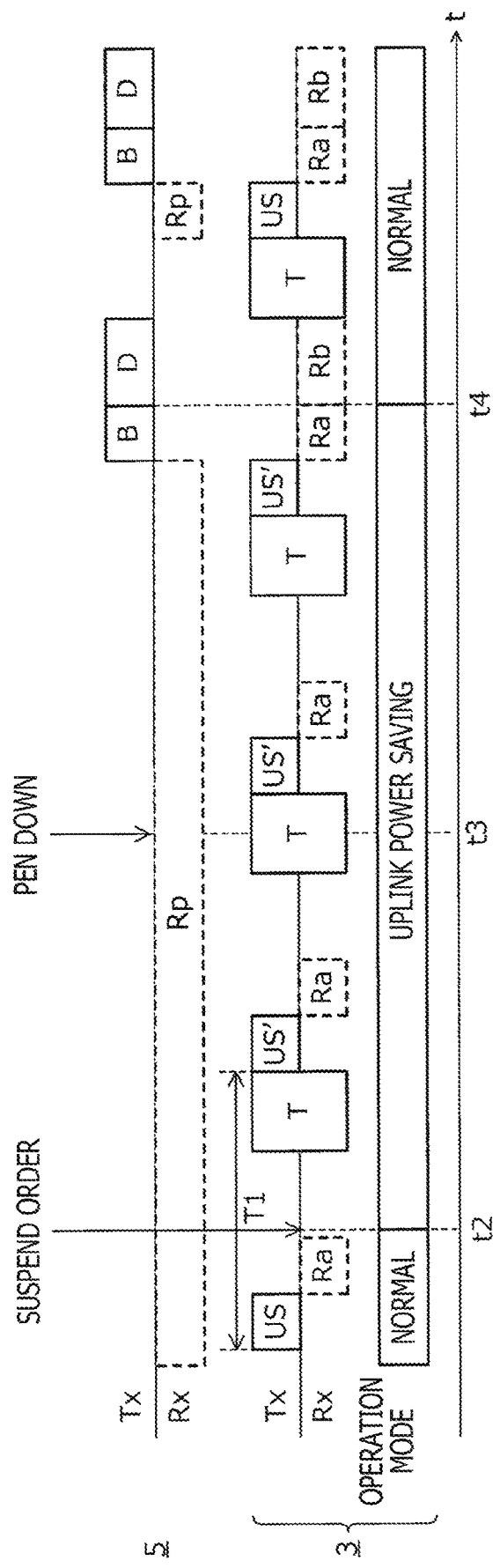
FIG. 3 is a diagram depicting a process of the touch controller according to a first example.

FIG. 3 is a diagram depicting a process of the touch controller 3 according to a first example. The touch controller 3 according to the example decreases the transmission voltage of the uplink signal US to reduce the power in transmitting the uplink signal. In addition, the pen signal PS transmitted by the pen 5 in response to the uplink signal US transmitted by decreasing the transmission voltage is used as the predetermined trigger. The details will now be described.

The touch controller 3 enters into the uplink power saving mode after receiving the suspend order at time t2 and then transmits an uplink signal US' instead of the uplink signal US. The uplink signal US' is a signal different from the uplink signal US in that the transmission voltage is a second voltage (for example, 3.3V) lower than the first voltage (for example, 9V). The operation of the touch controller 3 is similar to the operation in the normal mode in other respects. Note that a "pen-down state" in the following description denotes a state in which the pen 5 is in the reception range of the uplink signal US transmitted in the normal mode.

The transmission voltage is low, and the reception range of the uplink signal US' is narrower than the reception range of the uplink signal US. As a result, the pen 5 needs to be closer to the touch surface than in the reception of the uplink signal US in order to receive the uplink signal US'. In the example of FIG. 2, although the pen 5 is in the pen-down state at time t3, the pen 5 cannot receive the uplink signal US' transmitted just after time t3. This is because although the pen 5 is in the reception range of the uplink signal US, the pen 5 is not in the reception range of the uplink signal US' yet. However, when the user uses the pen 5 to perform the input, the pen 5 steadily approaches the touch surface in a normal case. As a result, the pen 5 can receive the next uplink signal US'. The touch controller 3 returns to the normal mode at time t4 in response to the reception of the pen signal PS transmitted by the pen 5 receiving the uplink signal US'.

Figure 4:
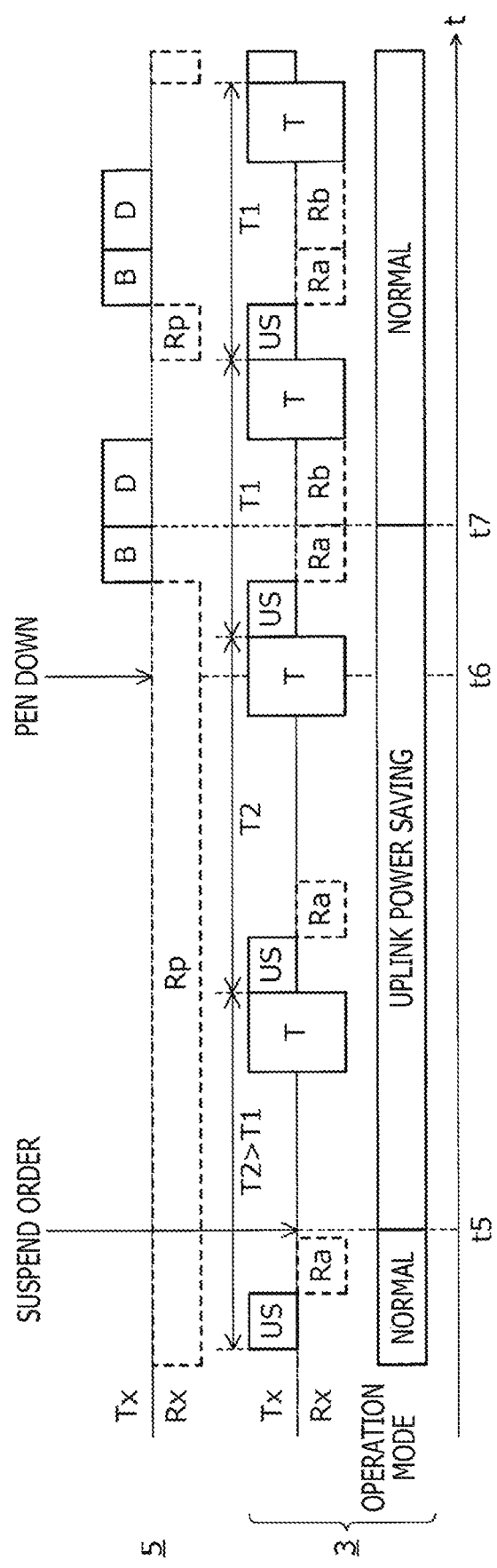
FIG. 4 is a diagram depicting a process of the touch controller according to a second example.

FIG. 4 is a diagram depicting a process of the touch controller 3 according to a second example. The touch controller 3 according to the example extends the transmission cycle of the uplink signal US to reduce the power in transmitting the uplink signal. In addition, the pen signal PS transmitted by the pen 5 in response to the uplink signal US is used as the predetermined trigger as in the first example. The details will now be described.

The touch controller 3 enters into the uplink power saving mode after receiving the suspend order at time t5 and then changes the transmission cycle of the uplink signal US from the first cycle T1 to a longer second cycle T2 (>T1). Accordingly, the reception cycle of the burst signal B and the execution cycle of the touch detection operation are also changed from the first cycle T1 to the second cycle T2. The operation of the touch controller 3 is similar to the operation in the normal mode in other respects.

The transmission cycle of the uplink signal US is long, and the detection timing of the pen 5 in the uplink power saving mode is later than in the normal mode. However, it is not that the pen 5 cannot be detected forever, and the pen 5 can be eventually detected. In the example of FIG. 4, the touch controller 3 can detect the pen signal PS transmitted by the pen 5 at time t7 after the pen 5 enters into the pen-down state at time t6. Here, time t7 is time as much as second cycle T2 later than time t6. The touch controller 3 returns to the normal mode in response to the detection of the pen signal PS.

Figure 5:
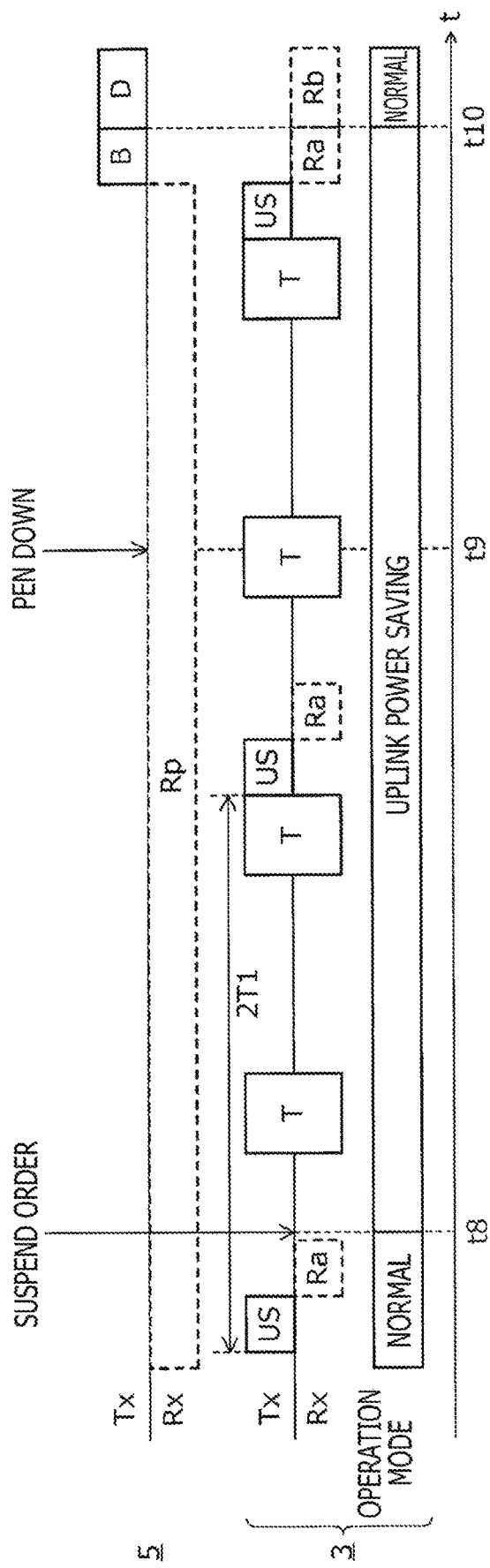
FIG. 5 is a diagram depicting a process of the touch controller according to a third example.

FIG. 5 is a diagram depicting a process of the touch controller 3 according to a third example. The touch controller 3 according to the example reduces the transmission frequency of the uplink signal US to reduce the power in transmitting the uplink signal. In addition, the pen signal PS transmitted by the pen 5 in response to the uplink signal US is used as the predetermined trigger as in the first and second examples. The details will now be described.

The touch controller 3 enters into the uplink power saving mode after receiving the suspend order at time t8 and then changes the transmission frequency of the uplink signal US from a first frequency (once in first cycle T1) to a second frequency (for example, once in n times the first cycle T1, where n is an integer equal to or greater than 2). Note that FIG. 5 illustrates an example of n=2. Accordingly, the execution frequency of the reception operation of the burst signal B is also changed from the first frequency to the second frequency. The operation of the touch controller 3 is similar to the operation in the normal mode in other respects.

The transmission frequency of the uplink signal US is low, and the detection timing of the pen 5 in the uplink power saving mode is later than in the normal mode.

However, it is not that the pen 5 cannot be detected forever, and the pen 5 can be eventually detected. In the example of FIG. 4, the touch controller 3 can detect the pen signal PS transmitted by the pen 5 at time t10 after the pen 5 enters into the pen-down state at time 9. Here, time t10 is time as much as n×T1 later than time t9. The touch controller 3 returns to the normal mode in response to the detection of the pen signal PS.

Figure 6:
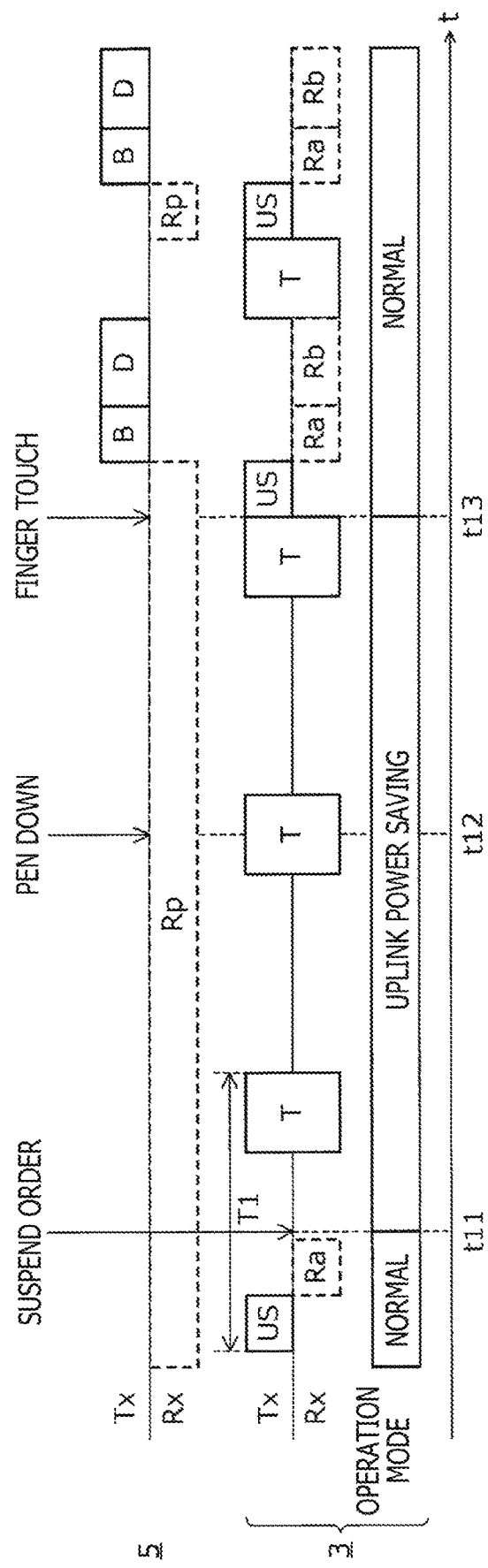
FIG. 6 is a diagram depicting a process of the touch controller according to a fourth example.

FIG. 6 is a diagram depicting a process of the touch controller 3 according to a fourth example. The touch controller 3 according to the example stops the transmission of the uplink signal US to reduce the power in transmitting the uplink signal. In addition, the detection of the finger touch is used as the predetermined trigger. The details will now be described.

The touch controller 3 enters into the uplink power saving mode after receiving the suspend order at time t11 and then stops the transmission of the uplink signal US. Accordingly, the reception operation of the burst signal B is also stopped. The operation of the touch controller 3 is similar to the operation in the normal mode in other respects.

In the example, the touch controller 3 does not transmit the uplink signal US, and the pen 5 cannot transmit the pen signal PS. Although there is pen-down at time t12 in the example of FIG. 6, the uplink signal US is not transmitted, and the pen 5 does not transmit the pen signal PS. Therefore, the reception of the pen signal PS cannot be used as the trigger to return the touch controller 3 to the normal mode.

Therefore, the touch detection operation periodically performed by the touch controller 3 is used in the example. Specifically, the touch controller 3 is returned to the normal mode in response to the detection of the touch operation of the finger F at time t13. In this way, the transmission of the uplink signal US is restarted, and the touch controller 3 can detect the pen 5 as usual.

Figure 7:
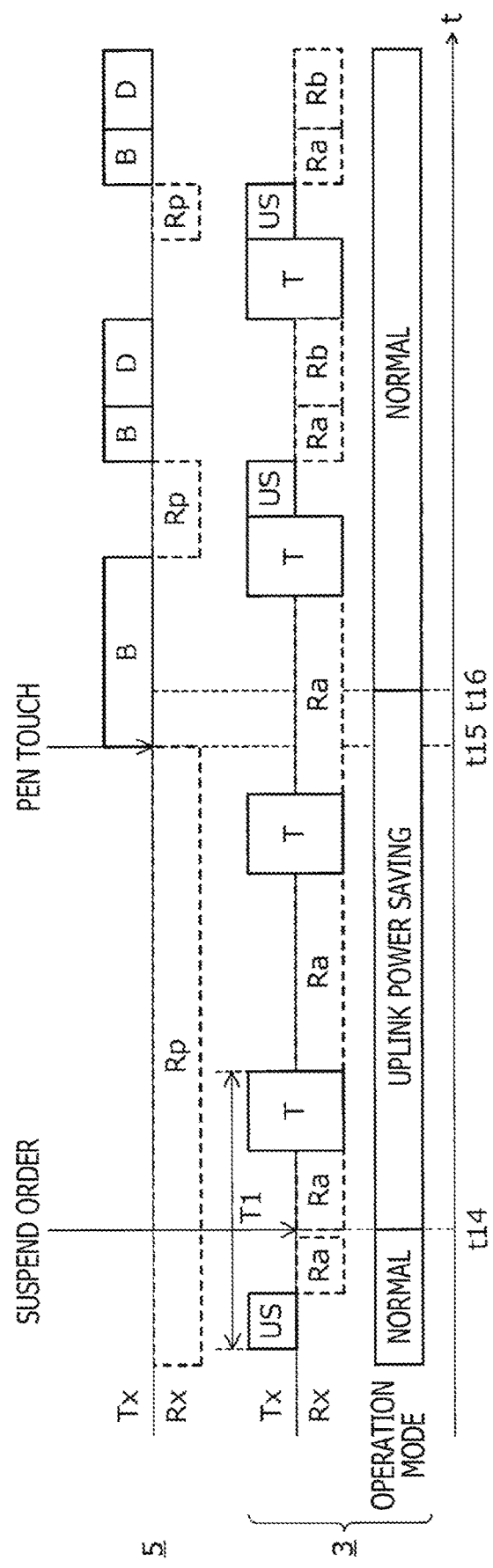
FIG. 7 is a diagram depicting a process of the touch controller according to a fifth example.

FIG. 7 is a diagram depicting a process of the touch controller 3 according to a fifth example. In the example, the pen 5 is configured to start the transmission of the pen signal PS in response to the detection of the pen touch. Note that the pen 5 can detect the pen touch when the pressure sensor detects application of pressure to the nib (that is, when the pen pressure value becomes a value greater than 0). The touch controller 3 is configured to stop the transmission of the uplink signal US to reduce the power in transmitting the uplink signal and configured to intermittently perform the reception operation of the pen signal PS (burst signal B) while the touch controller 3 is in the uplink power saving mode. The predetermined trigger in the example is the pen signal PS received in the reception operation. The details will now be described.

The touch controller 3 enters into the uplink power saving mode after receiving the suspend order at time t14 and then stops the transmission of the uplink signal US. The touch controller 3 also performs the reception operation of the burst signal B when the touch controller 3 is not performing the touch detection operation. The operation of the touch controller 3 is similar to the operation in the normal mode in other respects.

Once the pen 5 detects the pen touch at time t15, the pen 5 transmits the burst signal B for a certain period. The pen 5 then returns to the reception waiting state of the uplink signal US. The touch controller 3 returns to the normal mode at time t16 in response to the detection of the burst signal B transmitted in this way. The transmission of the uplink signal US is then restarted, and the touch controller 3 can detect the pen 5 as usual.

As described above, according to the present embodiment, the predetermined trigger can be used to return the touch controller 3 operating in the uplink power saving mode to the normal mode regardless of the uplink signal US (that is, without transmitting the uplink signal US during the operation in the uplink power saving mode). This can reduce the power consumption of the touch controller 3.

Particularly, the pen 5 starts to transmit the pen signal PS in response to the detection of the pen touch according to the fifth example. Therefore, even when the transmission of the uplink signal US is stopped in the uplink power saving mode, the touch controller 3 can be triggered by the pen signal PS to return to the normal mode.

Although the preferred embodiment of the present disclosure has been described, the present disclosure is not limited to the embodiment in any way, and it is obvious that the present disclosure can be carried out in various modes without departing from the scope of the present disclosure.

For example, the first to fifth examples may be independently used or may be used in any combination. For example, the touch controller 3 entered into the uplink power saving mode may decrease the transmission voltage of the uplink signal US and extend the transmission cycle to reduce the transmission frequency. Furthermore, when the transmission of the uplink signal US is stopped to reduce the power in transmitting the uplink signal, both of the detection of the finger touch and the detection of the pen signal PS in response to the detection of the pen touch by the pen 5 may be used as the predetermined triggers for returning to the normal mode. Furthermore, the detection of the finger touch may be used as the predetermined trigger for returning to the normal mode even when the transmission of the uplink signal US is not stopped.

What is claimed is:

1. A touch controller comprising:
a processor; and
a memory coupled to the processor, wherein the memory stores instructions that, when executed by the processor, cause the touch controller to:
operate in a normal mode in which an uplink signal that causes an electronic pen to transmit a pen signal is transmitted, and
operate in an uplink power saving mode in which the uplink signal is not transmitted,
wherein operation in the uplink power saving mode is triggered by reception of a suspend order from a host computer, and
wherein operation in the normal mode is triggered by detection of the pen signal transmitted by the electronic pen during operation in the uplink power saving mode.

2. The touch controller according to claim 1, wherein:
the pen starts transmitting the pen signal in response to detection of a pen touch.

3. The touch controller according to claim 2, wherein:
the pen detects the pen touch when the pen detects application of pressure to a nib.

4. The touch controller according to claim 1, wherein:
the uplink signal indicates that a pen pressure value is to be transmitted by the electronic pen to the touch controller.

5. The touch controller according to claim 1, wherein:
the uplink signal indicates that an identifier of the electronic pen is to be transmitted by the electronic pen to the touch controller.

6. A pen input system comprising:
an electronic pen which, in operation, transmits a pen signal; and
a touch controller which operates in a normal mode in which an uplink signal that causes the electronic pen to transmit the pen signal is transmitted, and operates in an uplink power saving mode in which the uplink signal is not transmitted, wherein operation in the uplink power saving mode is triggered by reception of a suspend order from a host computer, and wherein operation in the normal mode is triggered by detection of the pen signal transmitted by the electronic pen during operation in the uplink power saving mode.

7. The pen input system according to claim 6, wherein:
the pen starts transmitting the pen signal in response to detection of a pen touch.

8. The pen input system according to claim 7, wherein:
the pen detects the pen touch when the pen detects application of pressure to a nib.

9. A pen input system comprising:
an electronic pen which, in operation, starts transmitting a pen signal in response to detection of a pen touch; and
a touch controller which operates in a normal mode in which an uplink that causes the electronic pen to transmit the pen signal is transmitted, and operates in an uplink power saving mode in which the uplink signal is not transmitted,
wherein operation in the uplink power saving mode is triggered by reception of a suspend order from a host computer, and
wherein operation in the normal mode is triggered by detection of the pen signal transmitted by the electronic pen during operation in the uplink power saving mode.

10. The pen input system according to claim 9, wherein:
the pen detects the pen touch when the pen detects application of pressure to a nib.

* * * * *